(No Model.)
3 Sheets—Sheet 1.
F. H. RICHARDS.
BUTTON FASTENER SETTING MACHINE.
No. 311,033. Patented Jan. 20, 1885.
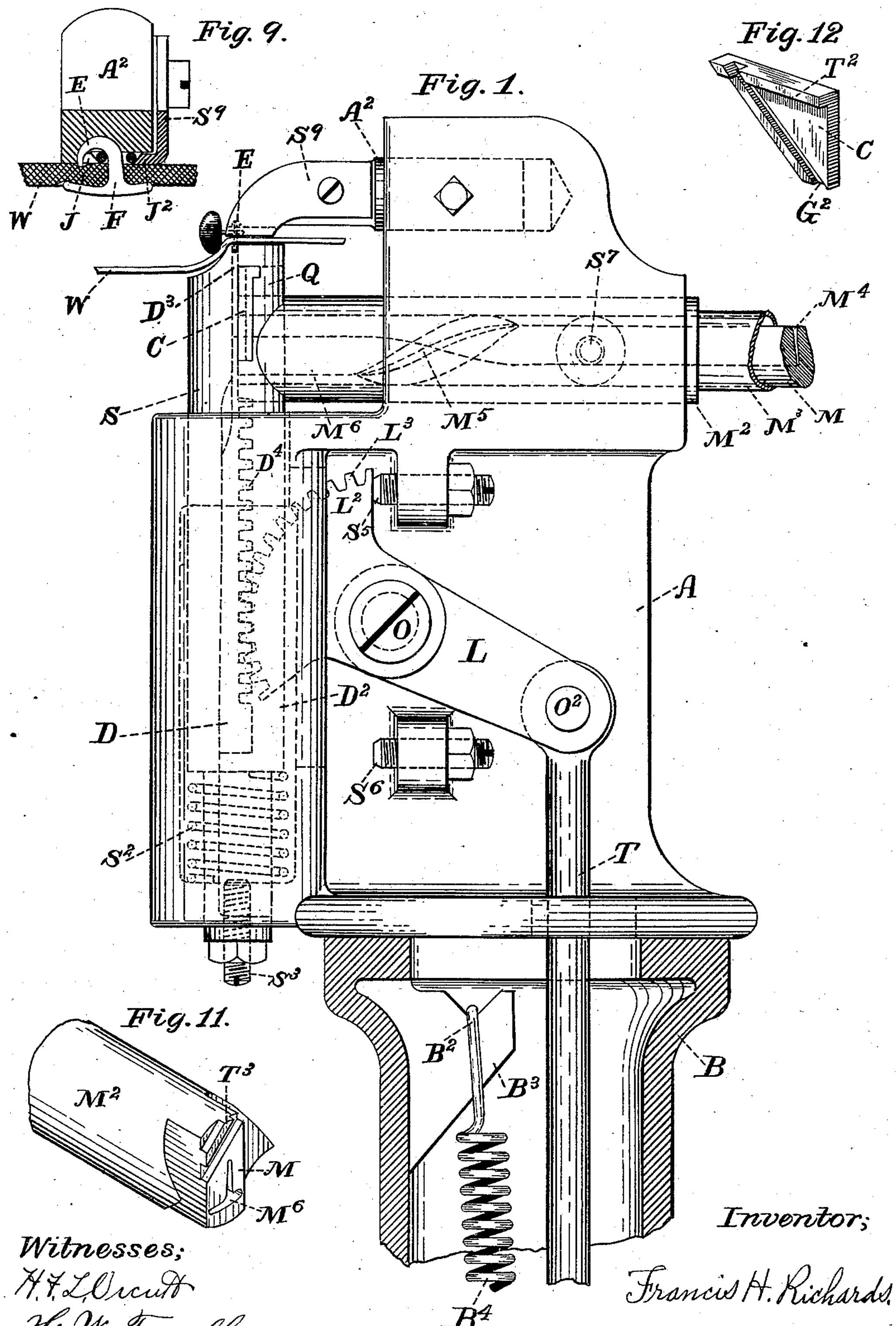
Witnesses;
H. F. L. Orcutt
H. W. Faulkner.
Inventor;
Francis H. Richards.
N. PETERS. Photo-Lithographer, Washington, D. C.

(No Model.)
3 Sheets—Sheet 2.
F. H. RICHARDS.
BUTTON FASTENER SETTING MACHINE.
No. 311,033. Patented Jan. 20, 1885.
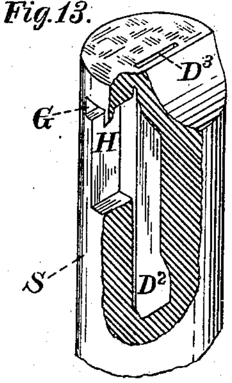
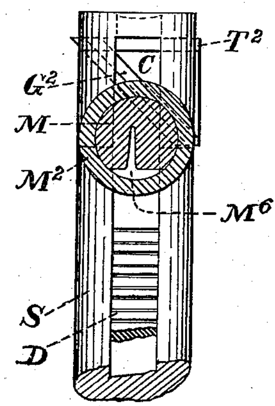
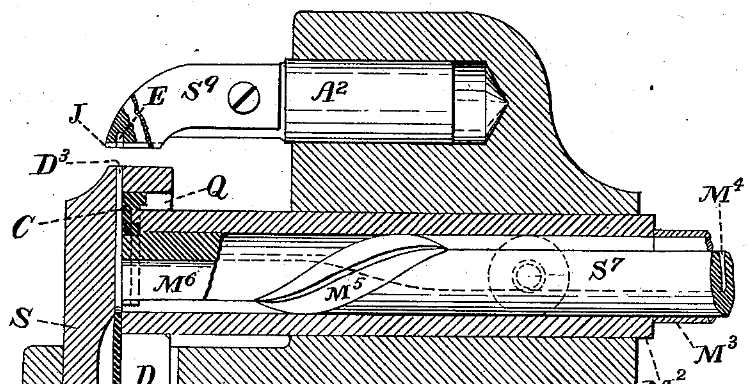
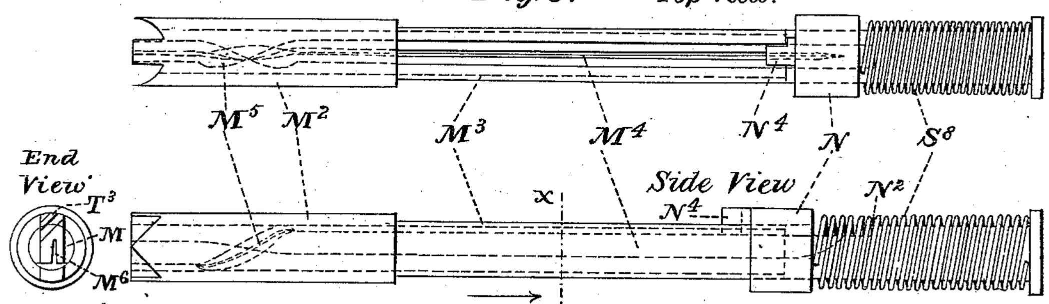
Witnesses;
H. F. L. Orcutt.
H. W. Faulkner.
Inventor;
Francis H. Richards.
N. PETERS. Photo-Lithographer. Washington, D. C.

(No Model.) 3 Sheets—Sheet 3.
F. H. RICHARDS.
BUTTON FASTENER SETTING MACHINE.
No. 311,033. Patented Jan. 20, 1885.
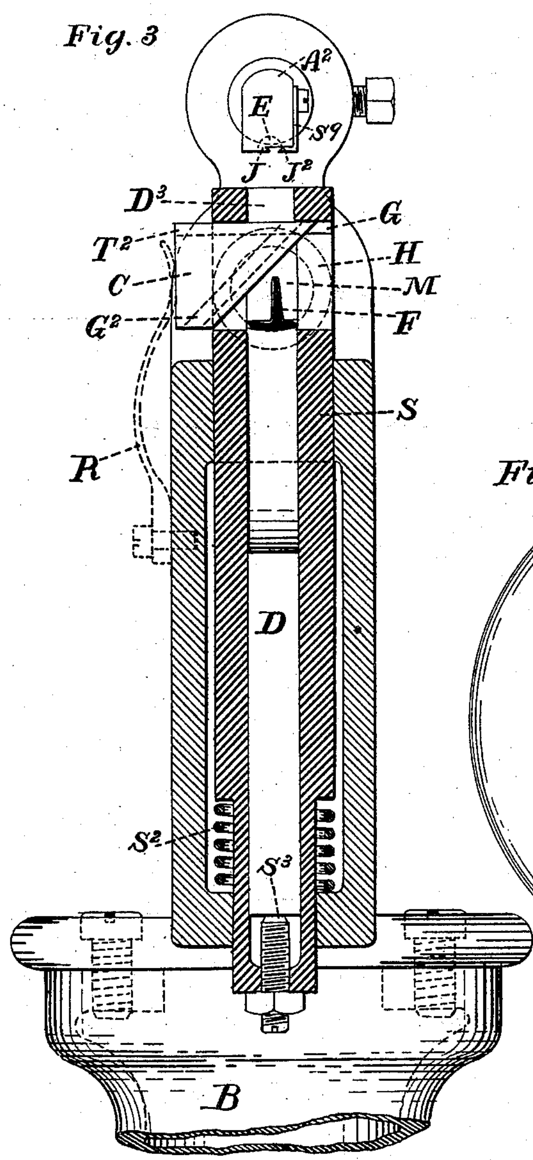
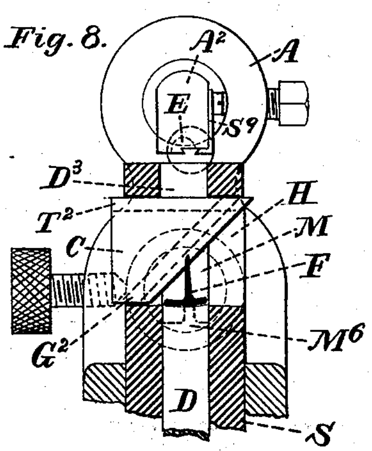
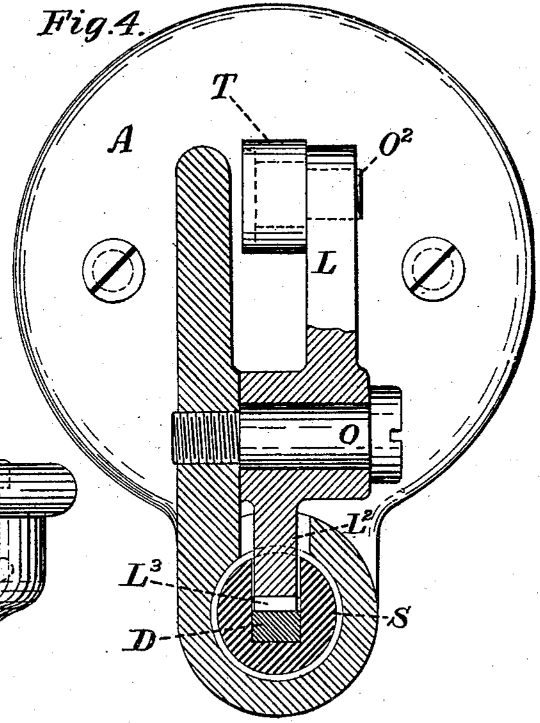
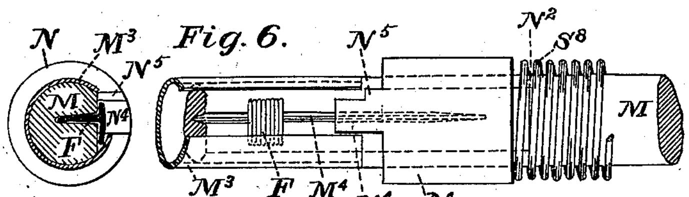
Inventor;
Francis H. Richards.
Witnesses;
H. F. L. Orcutt
H. W. Faulkner.
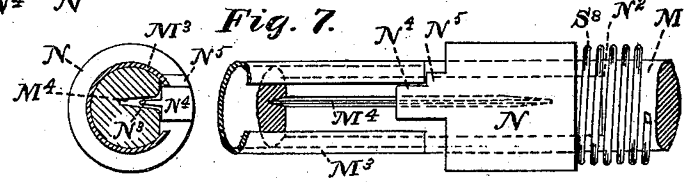
N. PETERS, Photo-Lithographer, Washington, D. C.

UNITED STATES PATENT OFFICE.

FRANCIS H. RICHARDS, OF SPRINGFIELD, MASS., ASSIGNOR TO THE AMERICAN BUTTON FASTENER COMPANY, OF NEW BRITAIN, CONN.

BUTTON-FASTENER-SETTING MACHINE.

SPECIFICATION forming part of Letters Patent No. 311,033, dated January 20, 1885.

Application filed September 24, 1884. (No model.)

*To all whom it may concern:*

Be it known that I, FRANCIS H. RICHARDS, a citizen of the United States, residing at Springfield, county of Hampden, State of Massachusetts, have invented certain new and useful Improvements in Button-Fastener-Setting Machines, of which the following is a specification, reference being had to the accompanying three sheets of drawings, forming a part thereof, in which—

Figure 1 is an elevation of the right-hand side of the machine, the parts being shown in their positions when the driver is near the end of its upward stroke. Fig. 2 is a similar view, partially in section, showing the parts in their position when the driver is in its lowest position. In each of these figures only a part of the magazine is shown. Fig. 3 is a front elevation, partially in section. Fig. 4 is a plan view, in which the upper portion of the machine is removed, the better to show the construction of certain parts. Fig. 5 is a series of views, on a reduced scale, of the magazine. Fig. 6 is a view, not reduced, of a part of the magazine, showing it closed and the follower pushed back ready to be locked there. Fig. 7 is a similar view showing the magazine open and the follower locked back. Fig. 8 is a view of a part of Fig. 3, showing the driver-channel cover in a different position. Fig. 9 is an enlarged vertical section of the setting-die, showing a fastener set through a piece of fabric and the eye of a button. Fig. 10 is a rear view of the upper part of slide S, showing a section of the magazine and the driver-channel cover. Fig. 11 is a perspective view of the front end of the magazine. Fig. 12 is a similar view of the driver-channel cover; and Fig. 13 is a perspective view, partially in section, of the upper end of the press-slide.

Similar letters refer to similar parts throughout the several views.

This invention relates to machinery especially adapted for setting or inserting into shoe-uppers that kind of button-fasteners known in the market as "Kempshall's One-Prong Button-Fasteners." This fastener is a flat piece of metal, shaped substantially as shown at F, Fig. 3, having a single prong and a bar or head at about right angles thereto, preferably so made relative to said prong that when this is set in a shoe-upper or fabric, as W, Figs. 1 and 9, it being then bent into a hook through the eye of the button, the button will pull centrally on said head.

The invention has for its object to furnish a simple, convenient, and efficient machine, adapted to be operated by foot-power, in which a supply of the button-fasteners are fed from a magazine to a driving mechanism, whereby they may be inserted one at a time into a shoe-upper, the prong of the fastener passing through the eye of a button suitably held above said shoe-upper, and then clinching to hold said button thereto.

For the attainment of this object the invention consists in certain devices and combinations of mechanism, which I will first describe in connection with the drawings, and afterward point out in the claims.

In the drawings, A is the frame of the machine, which may be constructed in any manner suitable to support the parts secured thereon. This frame is preferably supported by a stand or column, of which B, Fig. 1, represents the upper end, the bottom being furnished with an ordinary treadle mechanism for operating the machine.

Power is transmitted from the treadle to the operative parts of the machine above by means of the usual treadle-rod, T. A spiral or other pull-spring, $B^4$, Fig. 1, is secured one end to the said rod T near the treadle, the other end (not shown) being formed into a hook, $B^2$, which is hooked onto the lug $B^3$ near the top of the column. This is the arrangement I prefer for drawing up the treadle-rod; but any other suitable devices may be used in place thereof.

S is the slide or presser-slide, on the top of which the shoe-upper is placed. It has a rectangular slot, $D^2$, to receive the driver D and other details, and to facilitate its manufacture has, preferably, a cylindrical external form. This slide is held up by a spring, $S^2$, and is depressed by the driver. It is prevented from rotating by the front end of the magazine entering the slot wherein lies said driver. The stop at the lower end of the slide, against which the lower end of the driver strikes, is preferably made adjustable, and, as shown herein, it consists of a screw, $S^3$, provided with a check-nut, $S^4$. Near its upper end a mortise, H, is formed in or through the slide across the driver-slot, to receive the driver-channel cover C, hereinafter described. The driver-slot is contracted at its upper end into a channel, $D^3$, called the "driver-channel," up through which the fasteners pass on their way from the magazine to the setting-die. The upper end of the driver is reduced to conform to this channel.

D is the driver, formed at its upper end to pass through the driver-channel, and provided with means, preferably rack-teeth $D^4$, as shown, whereby it is operated.

L is a lever, (pivoted to the frame at O,) to which the treadle-rod is connected at $O^2$, and which has a segment, $L^2$, provided with gear-teeth $L^3$, meshing with said rack-teeth. This gearing is used because it is a convenient way to transmit motion from the lever to the driver; but a common link connected at one end to the lever and at the other to the driver may be substituted for the same. Inasmuch as in using the machine it is desirable, in order to properly set the fasteners, that the upward stroke of the driver should be limited, the stop $S^5$ is provided for this purpose. This stop is preferably made adjustable, for which reason I use a screw therefor. The downward stroke of the driver is limited by a similar stop, $S^6$, which also is preferably made adjustable, a screw being used therefor. It is my intention to cover by my claims each of these stops in combination, whether or not said stops are made adjustable.

M is the magazine, which consists of a cylindrical rod grooved substantially as shown, to receive a supply of the button-fasteners. This rod fits and is fixed into the magazine-case $M^2$, which case is removably fitted into the frame, as shown, being preferably held therein by a thumb-screw, $S^7$, by loosening which the magazine may be removed.

The principal part of magazine-groove $M^4$ is made to facilitate supplying fasteners to the same on the upper side of the rod; but after entering case $M^2$ it takes a spiral course at $M^5$ through an angular space of not more than one hundred and eighty degrees, thus inverting the fasteners therein and delivering them to the driver-channel with their prongs upward, as required. The spiral section $M^5$ may reach to the driver-channel; but I prefer the magazine to terminate in a short inverted straight section, $M^6$, as being more certain to properly deliver the fasteners to said channel. The rear end of the aforesaid rod is larger than the front and middle portions thereof, and the part between said enlargement and case $M^2$ is partially inclosed by the close-fitting magazine-lock $M^3$, having the same external diameter as said rear-end enlargement. This lock consists of a tube having a slot on one side slightly wider than the length of the fastener-head. (See Figs. 5, 6, and 7.) A follower, N, having a tongue, $N^3$, Fig. 7, fitting groove $M^4$, is adapted to slide outside of this lock and back onto said enlargement as far as shown in Figs. 6 and 7, being stopped at that point by a stop, $N^2$, formed on the magazine. On the front end of the follower there is a projection, $N^4$, which, when the follower is clear back, reaches forward between the edges of lock $M^3$, limiting its rotary motion in both directions. Back of this projection the follower widens out to form the catch $N^5$, which, when lock $M^3$ is in its open position, as in Fig. 7, stands behind one corner of said lock. This effectually prevents said follower from being thrown forward by spring $S^8$. While that lock is in said open position a supply of the button-fasteners can be placed in groove $M^4$, and locked therein by turning said lock to the position shown in Fig. 6, which also permits the follower to be driven forward by said spring $S^8$. This pushes the fasteners along the groove, past the spiral portion thereof, to the driver-channel. It will be understood that the follower only reaches to, or nearly to, the spiral part of the groove, not through it, and that the fasteners immediately in front of said follower act to push through said spiral part those fasteners further forward. The front end of the magazine, including case $M^2$, is shaped as shown best in the end and plan views of Fig. 5 and in Fig. 11. so as to enter the driver-slot in slide S, thereby preventing said slide from turning and delivering the fasteners to the driver-channel.

Above slide S an arm, $A^2$, is secured in the frame, in which the die E is formed, and said arm is adjusted so as to bring this die directly over the driver-channel. This die has a beveled edge or lip, J, and arm $A^2$ is furnished with a spring, $S^9$, having a similar edge or lip, $J^2$. These two edges act to hold the eye of a button in proper and fixed relation to die E. By making one of those beveled edges integral with said die that side of the button-eye over which the fastener-prong passes is always held in the same position, which would not be the case if two springs, one on each side of the die, were used and the eyes varied at all in size. Hence this construction has a well-defined element of utility not possessed by one in which two springs are used to hold the buttons to the die.

It will be observed that since the magazine is stationary and the slide has a vertical motion, the driver-channel, measured from the bottom of the magazine-groove to the top of the slide, is longer when the slide is up than when it is down, that there is naturally an opening to said channel immediately above the magazine at Q, in front of which the fasteners must pass on their way from said magazine up to the setting-die E, and that some means is obviously desirable for preventing said fasteners from getting out of position while passing said opening. The means I prefer to use for this purpose consist of a cover, C, having a wedge-shaped form, as shown in Figs. 1, 2, 3, 8, and 12, which cover forms a part of the rear side of the driver-channel. This cover lies in a passage or mortise, H, through slide S, has a tongue, $T^2$, fitting into groove G of said mortise, and has a groove, $G^2$, fitting over a tongue, $T^3$, formed on the magazine. All of these tongues and grooves are preferably on the rear side of said cover, to avoid interfering with the passage of fasteners in channel $D^3$. The tongue $T^2$ limits the motion of cover C to a horizontal direction relative to the slide, and tongue $T^3$ limits it to an inclined direction relative to the magazine, these motions being simultaneous, and caused directly by the motion of said slide. By means of this device the aforesaid opening Q is always covered, whatever may be the position of slide S.

While I prefer to use the aforesaid tongues and grooves for the purpose of properly operating cover C, their use is not necessary, for the same form of cover may be used without them, a spring, as R, Fig. 3, being provided to press said cover against its bearing-surfaces.

The mode of operation of this machine is as follows: The treadle-rod and the parts connected thereto being in the position shown in Fig. 2, the magazine properly supplied with button-fasteners, and the follower acting to crowd said fasteners forward, as described, the shoe-upper or fabric to which buttons are to be secured is then placed in position under die E, as in Fig. 1, and a button placed with its eye between lips J $J^2$. The treadle-rod is then drawn down, thereby raising the slide and driver together until the slide is in the position shown in Fig. 1, and then continuing the upward movement of said driver with a fastener above it until this also reaches the position shown in said figure, setting the fastener, as shown in Fig. 9, the said upward motion being limited by stop $S^5$. This operation being completed, the treadle-rod is allowed to rise—being drawn up by the spring in column B—returning the driver and slide to their original position, ready for a repetition of the same.

I have not particularly described the construction of die E, because the required form thereof is the same as now commonly used in various well-known instruments for setting other kinds of button-fasteners.

In another application, Serial No. 142,969, filed September 13, 1884, I have described and claimed certain combinations having as elements thereof a driver-channel, magazine, setting-die, and driver, together with an actuating mechanism, which are similar in some respects to those elements as shown in this application. I do not, therefore, claim, broadly, herein any of said elements, except in the particular combinations pointed out in the following claims.

Having now described my invention, what I claim to be new, and therefore desire to secure by Letters Patent of the United States, is—

1. In a button-fastener-setting machine, a setting-die having a fixed position therein, a presser-slide, substantially as described, adapted to hold leather or fabric against said die, and having a driver-channel, substantially as described, and a lateral opening, through which button-fasteners may be introduced into said channel above a driver, a magazine extending into said lateral opening, and adapted to deliver button-fasteners one at a time into said channel above a driver, and a driver adapted to drive said fasteners through said channel and said leather or fabric against said die, in combination substantially as set forth.

2. In a button-fastener-setting machine, a setting-die having a fixed position therein, a movable presser-slide, substantially as described, adapted to hold leather or fabric against said die, and having a driver-channel and a lateral opening to receive the end of a magazine, and a passage for a driver-channel cover, a fixed magazine extending into said opening, and a driver-channel cover adapted to close the variable portion of said lateral opening which is above said magazine, in combination substantially as described.

3. In a button-fastener-setting machine, the die E, the slide S, substantially as described, having channel $D^3$, the magazine M, and the driver D, in combination substantially as described.

4. In a button-fastener-setting machine, the combination of the die E, the slide S, having channel $D^3$, the magazine M, the driver D, and lever L, provided with connecting-gearing, substantially as described, and the stop $S^5$, substantially as set forth.

5. In a button-fastener-setting machine, the combination of the die E, the slide S, having channel $D^3$, the magazine M, the driver D, and lever L, provided with connecting-gearing, substantially as described, and stop $S^6$, substantially as specified.

6. In a button-fastener-setting machine, the combination of the die E, the slide S, having channel $D^3$, the magazine M, the driver D, and lever L, provided with connecting-gearing, substantially as described, the stop $S^5$, and stop $S^6$, substantially as set forth.

7. In a button-fastener-setting machine, a frame adapted to carry the die E and slide S, the die E, the slide S, the spring $S^2$, adapted to press said slide against said die, the driver D, and the stop $S^3$ on said slide, whereby said driver may act to force the same away from said die through a distance determined by the position of said stop, in combination substantially as described.

8. In a button-fastener-setting machine, slide S, having stop $S^3$, spring $S^2$, driver D, rod T, connecting mechanism, substantially as described, intermediate to said rod and driver, and spring $B^4$, in combination substantially as set forth.

9. In a button-fastener-setting machine, slide S, having stop $S^3$, spring $S^2$, driver D, rod T, connecting mechanism, substantially as described, intermediate to said rod and driver, spring $B^4$, stop $S^5$, and stop $S^6$, in combination substantially as set forth.

10. The magazine M, having the spiral section $M^5$, substantially as and for the purpose described.

11. A button-fastener magazine consisting of a rod having a straight groove, $M^4$, and a spiral groove, $M^5$, in combination with a case inclosing said spiral groove, substantially as described.

12. A button-fastener magazine consisting of a rod having groove $M^4$, and having spiral groove $M^5$, inclosed by a case, in combination with a follower adapted to invert the fasteners by pushing them from said groove $M^4$ through said spiral groove, substantially as described.

13. In combination, a magazine having groove $M^4$ and the magazine-lock $M^3$, substantially as and for the purpose described.

14. In combination, magazine M, having groove $M^4$, magazine-lock $M^3$, and follower N, having tongue $N^3$ and projection $N^4$, substantially as and for the purpose described.

15. In combination, magazine M, having groove $M^4$, magazine-lock $M^3$, and follower N, having tongue $N^3$ and catch $N^5$, substantially as described.

16. In combination, magazine M, having groove $M^4$ and stop $N^2$, magazine-lock $M^3$, and follower N, having tongue $N^3$, projection $N^4$, and catch $N^5$, substantially as described.

17. In combination, a part, as $A^2$, having formed therein the setting-die E, and provided with the lip J, and a spring having the similar lip $J^2$, substantially as for the purpose described.

18. Slide S, having mortise H and groove G, magazine M, having tongue $T^3$, and cover C, having tongue $T^2$ and groove $G^2$, in combination substantially as described.

In testimony whereof I have hereunto signed my name this 22d day of September, A. D. 1884.

FRANCIS H. RICHARDS.

Witnesses:

H. W. FAULKNER,

H. F. T. ORCUTT.